May 23, 1939.     J. J. LEONARDO     2,159,811
PIPE FITTING
Filed March 18, 1938

Inventor
John J. Leonardo
By W. L. Douden
Attorney

Patented May 23, 1939

2,159,811

UNITED STATES PATENT OFFICE 2,159,811

PIPE FITTING

John J. Leonardo, Philadelphia, Pa., assignor of one-half to Samuel Spector, Philadelphia, Pa.

Application March 18, 1938, Serial No. 196,591

2 Claims. (Cl. 285—115)

This invention relates to pipe fittings, and more particularly to pipe fittings of a type useful in residential water piping and in similar types of work, where it may be desirable to use either iron or brass pipe, or copper tubing or both.

Within recent years copper tubing has to a considerable extent replaced iron pipe in the type of installations above referred to, and is now used very extensively not only in new installations but also in repairs and additions to old installations. As a consequence, it is often necessary to connect tubing to pipe and to apparatus constructed for pipe connections. Adapters have been available for connecting tubing to pipe fittings, and couplings for connecting tubing to tubing, but the use of these elements in commercial practice has required the carrying, both in stock and to each job, of a large number and variety of different fittings. In addition, many situations arise for which there is no fitting available and connections must then be made by a suitable assembly of pipe and tubing fittings, with a corresponding increase in cost for both material and labor over that for a single suitable fitting.

My improved pipe fitting, which may be made in any desired size or style, is adapted to fit either pipe or tubing or both, and thereby eliminates the necessity for the large number and variety of fittings above referred to. I accomplish this result by making one or more of the ends of the fitting of such form that it may engage in cooperative relation either internally with standard pipe-size fittings or externally with tubing of the corresponding size, or the reverse.

One object of my invention is to provide an improved pipe fitting.

Another object of my invention is to provide a fitting adapted for use with either pipe or tubing.

Another object of my invention is to provide a fitting which may be used with both pipe and tubing.

Another object of my invention is to provide an improved boiler fitting.

Other and incidental objects of my invention will be apparent to those skilled in the art from a reading of the following specification and inspection of the accompanying drawing, in which.

Figure 1:
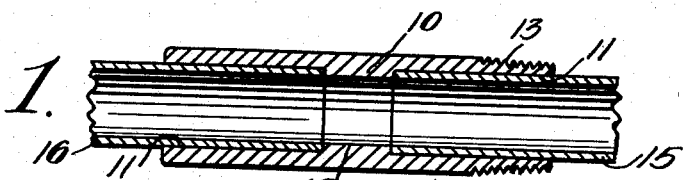
Figure 1 illustrates, in section, my invention as applied to one form of coupling.

All the figures of the drawing show the preferred forms of the invention as applied to the respective types of fittings, but the fitting which I have so far found to be of the greatest commercial utility is that shown in Fig. 1. This fitting, as well as those shown in the other figures, is shown approximately to scale as a half-inch fitting. The proportions would, of course, be varied in accordance with commercial practice for fittings of other sizes or of other shapes.

In the form of the invention shown in Fig. 1, the body 10 is, as in all forms of the invention, preferably formed of cast red brass, but it may be of any appropriate material. For example, yellow brass pipe of appropriate outside and inside diameters may be used if desired. The outside of this fitting is threaded as indicated at 13 to take a standard pipe-size fitting, for example, half-inch. The inside is counter-bored or reamed from each end as shown at 11 to take the corresponding size of copper tubing shown at 15 and 16. The boring from each end leaves a shoulder 12 which serves to approximately center the ends of the tubing between the ends of the fitting. This prevents the difficulty prevalent with some commercial types of fittings of ascertaining whether the tubing ends are centered in the fitting or if one extends almost completely through the fitting while the other is scarcely entered. The tubing, whether of copper or other appropriate material, is sweated into the fitting in the customary manner.

If desired, standard brass pipe may be used for making the fitting of Fig. 1, the shoulder 12 being provided by slight misalignment of the two counter-bores 11, since the inside diameter of the pipe is nearly the same as the outside diameter of the corresponding tubing.

Figure 3:
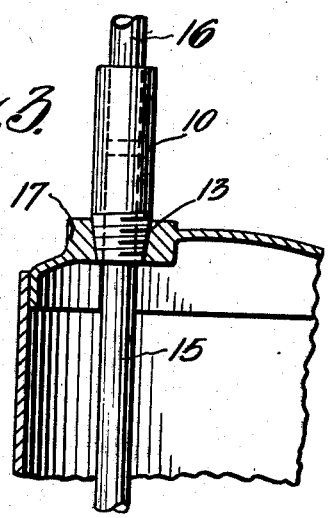
Figure 3 shows the coupling of Fig. 1 used as a boiler fitting.

A specific application of this form of fitting is illustrated in Fig. 3, where it is used as a boiler fitting. The copper tubing 16 is connected to the supply line. The fitting 10 is screwed into the threaded bushing 17 on the hot water supply boiler. The copper tubing extension 15, connected into the fitting as shown in Fig. 1, extends an appropriate distance, i. e. to below the normal demand level, into the boiler.

Figure 2:
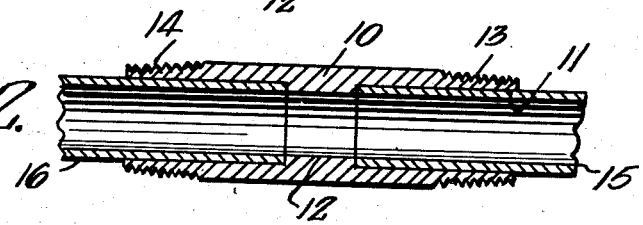
Figure 2 illustrates, in section, my invention as applied to a second form of coupling.

The second modification of my invention shown in Fig. 2 serves all the purposes of that shown in Fig. 1, and in addition serves as a pipe-size nipple, but does not present quite as neat an appearance when used either as a boiler fitting or as a copper tube coupling as that shown in Fig. 1.

Figure 4:
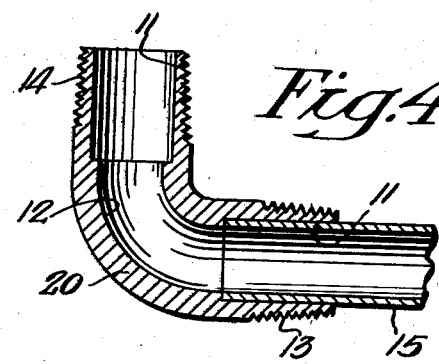
Figure 4 is a sectional view showing my invention as applied to one form of elbow.

The elbow shown in Fig. 4 is, of course, necessarily made as a casting, the body 20 thereof being preferably of red brass, but in all other respects it corresponds, as indicated by reference numerals, with the fitting of Fig. 2.

Figure 5:
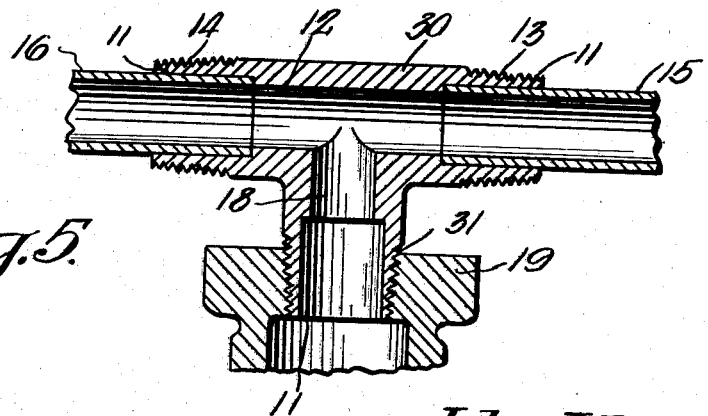
Figure 5 is a sectional view showing my invention as applied to one form of T.

The T shown in Fig. 5 corresponds, insofar as is indicated by corresponding reference numerals, with the fittings of Figs. 1, 2 and 4. The body 30 thereof is preferably cast, like the body 20 of the L of Fig. 4. All three ends may be threaded as indicated at 13, 14, and 31, or any desired arrangement of these ends may be threaded. In addition to the shoulder 12, provided in the preceding fittings, a shoulder 18 is provided in the stem of the T, so that any of the three outlets thereof may be connected to either tubing or pipe fittings. For example, the ends of the T at 13 and 14 may be connected to tubing as shown in Fig. 5, and the stem of the T may be connected to a threaded pipe fitting 19, or these connections may be rearranged in any desired manner.

It will be apparent to those skilled in the art that my invention is not limited to the modifications described above, but that it may be applied to any known type or size of pipe or tubing fitting. For example, the fitting may be internally threaded to a standard pipe size and externally sized and finished to provide a sweated joint to a larger size of tubing, appropriate external shoulders being provided; or any desired combination or arrangement of internal and external connections may be provided, limited only by the prior art.

Having now described my invention, I claim:

1. An adapter fitting for use either with thin wall copper pipe or conventional iron pipes, said fitting having an internal configuration adapted to receive copper pipe with a sweated connection, and carrying on the external surface conventional pipe thread adapted for use with conventional iron pipe.

2. An adapter fitting for use either with thin wall copper pipe or conventional iron pipes, said fitting having an internal configuration of each end adapted to receive copper pipe with a sweated connection, and carrying on the external surface of each end conventional pipe thread adapted for use with conventional iron pipe.

JOHN J. LEONARDO.